(12) United States Patent
Honda

(10) Patent No.: US 12,005,747 B2
(45) Date of Patent: Jun. 11, 2024

(54) TIRE MOUNTING STATE DETECTION SYSTEM, TIRE MOUNTING STATE DETECTION METHOD, AND TIRE MOUNTING STATE DETECTION PROGRAM

(71) Applicant: BRIDGESTONE CORPORATION, Tokyo (JP)

(72) Inventor: Kyohei Honda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 693 days.

(21) Appl. No.: 17/270,896

(22) PCT Filed: Aug. 8, 2019

(86) PCT No.: PCT/JP2019/031407
§ 371 (c)(1),
(2) Date: Feb. 24, 2021

(87) PCT Pub. No.: WO2020/045036
PCT Pub. Date: Mar. 5, 2020

(65) Prior Publication Data
US 2021/0213788 A1    Jul. 15, 2021

(30) Foreign Application Priority Data

Aug. 28, 2018 (JP) .................... 2018-159282

(51) Int. Cl.
*B60C 23/04* (2006.01)
*B60C 23/20* (2006.01)

(52) U.S. Cl.
CPC ...... *B60C 23/0416* (2013.01); *B60C 23/0437* (2013.01); *B60C 23/0444* (2013.01); *B60C 23/20* (2013.01)

(58) Field of Classification Search
CPC .............. B60C 23/007; B60C 23/0415; B60C 23/0416; B60C 23/0437; B60C 23/0444; B60C 23/20
See application file for complete search history.

(56) References Cited

U.S. PATENT DOCUMENTS

| 2005/0172707 | A1  | 8/2005  | Kanatani et al. |
| 2008/0055063 | A1* | 3/2008  | Mori ............. B60C 23/045 340/447 |
| 2008/0068147 | A1  | 3/2008  | Mori et al. |
| 2009/0002146 | A1  | 1/2009  | Lin |
| 2011/0282546 | A1  | 11/2011 | Heo et al. |
| 2013/0321139 | A1* | 12/2013 | Li ............. B60C 23/0437 340/447 |
| 2015/0077238 | A1* | 3/2015  | Kitagawa ....... B60C 23/0415 340/447 |

FOREIGN PATENT DOCUMENTS

| EP | 2631093 A1 | 8/2013 |
| JP | 61-33306 A | 2/1986 |
| JP | 2000-233615 A | 8/2000 |
| JP | 2005-178522 A | 7/2005 |
| JP | 2005-263021 A | 9/2005 |
| JP | 2005-349958 A | 12/2005 |
| JP | 2007-45201 A | 2/2007 |
| JP | 2008-74163 A | 4/2008 |
| JP | 2013-1219 A | 1/2013 |
| JP | 2014-31089 A | 2/2014 |
| KR | 10-2011-0052822 A | 5/2011 |

OTHER PUBLICATIONS

Matsuura, JP 2007-45201—English Translation (Year: 2007).*
Sekizawa, JP 2005-263021—English Translation (Year: 2005).*
International Search Report for PCT/JP2019/031407 dated, Sep. 10, 2019 (PCT/ISA/210).
Extended European Search Report dated Mar. 22, 2022 in European Application No. 19854615.2.
Office Action dated Mar. 10, 2022 by the Australian Patent Office in Australian Application No. 2019333661.

* cited by examiner

*Primary Examiner* — Michael J Dalbo
(74) *Attorney, Agent, or Firm* — Sughrue Mion, PLLC

(57) ABSTRACT

A tire mounting state detection system (100) is provided with a vehicle configuration holding unit (230) holding a vehicle configuration including the number of wheels of a vehicle (10); a transmitter number detection unit (250) detecting the number of transmitters based on a radio signal received by a receiving unit; a state detection unit (260) detecting whether or not the number of transmitters exceeds or is short the number of wheels based on the number of wheels based on the vehicle configuration and the number of transmitters detected; and an output unit (270) outputting that the state of the transmitter is abnormal when it is determined that the number of transmitters exceeds or is short the number of wheels.

4 Claims, 7 Drawing Sheets

FIG. 4

| | R1 | R2 | R1+R2 | Δn | |
|---|---|---|---|---|---|
| P1 | 2.59 | 2.51 | 5.09 | | |
| P1 | 2.59 | 2.49 | 5.08 | 0.01 | Δ1 |
| P2 | 2.37 | 2.56 | 4.93 | 0.15 | Δ2 |
| P4 | 2.33 | 2.32 | 4.65 | 0.27 | Δ3 |
| P5 | 2.24 | 2.38 | 4.62 | 0.03 | Δ4 |
| P6 | 2.19 | 2.42 | 4.61 | 0.01 | Δ5 |
| P3 | 2.31 | 2.16 | 4.47 | 0.14 | Δ6 |

FIG. 5

| | R1 | R2 | R1+R2 | Δn | |
|---|---|---|---|---|---|
| P1 | 2.59 | 2.49 | 5.08 | | |
| P2 | 2.37 | 2.56 | 4.93 | 0.15 | Δ1 |
| P4 | 2.33 | 2.32 | 4.65 | 0.27 | Δ2 |
| P5 | 2.24 | 2.38 | 4.62 | 0.03 | Δ3 |
| P6 | 2.19 | 2.42 | 4.61 | 0.01 | Δ4 |
| P5 | 2.18 | 2.32 | 4.50 | 0.11 | Δ5 |
| P3 | 2.31 | 2.16 | 4.47 | 0.03 | Δ6 |

FIG. 6

|    | R1   | R2   | R1/R2 | δn   |     |
|----|------|------|-------|------|-----|
| P1 | 2.59 | 2.49 | 1.04  |      |     |
| P1 | 2.59 | 2.51 | 1.03  | 0.01 | δ1  |
| P2 | 2.37 | 2.56 | 0.93  | 0.11 | δ2  |
| P3 | 2.31 | 2.16 | 1.07  |      | δ3  |
| P4 | 2.33 | 2.32 | 1.01  | 0.06 | δ4  |
| P5 | 2.24 | 2.38 | 0.94  | 0.06 | δ5  |
| P6 | 2.19 | 2.42 | 0.91  | 0.04 | δ6  |

FIG. 7

|    | R1   | R2   | R1/R2 | δn   |     |
|----|------|------|-------|------|-----|
| P1 | 2.59 | 2.49 | 1.04  |      |     |
| P2 | 2.37 | 2.56 | 0.93  | 0.12 | δ1  |
| P3 | 2.31 | 2.16 | 1.07  |      | δ2  |
| P4 | 2.33 | 2.32 | 1.01  | 0.06 | δ3  |
| P5 | 2.24 | 2.38 | 0.94  | 0.06 | δ4  |
| P5 | 2.18 | 2.32 | 0.94  | 0.00 | δ5  |
| P6 | 2.19 | 2.42 | 0.91  | 0.04 | δ6  |

FIG. 8

|  | R1 | R2 | R1+R2 | Δn |  |
|---|---|---|---|---|---|
| P2 | 2.31 | 2.54 | 4.85 |  |  |
| P5 | 2.10 | 2.34 | 4.44 | 0.41 | Δ1 |
| P4 | 2.19 | 2.25 | 4.44 | 0.00 | Δ2 |
| P6 | 2.03 | 2.38 | 4.41 | 0.03 | Δ3 |
| P3 | 2.20 | 2.11 | 4.31 | 0.10 | Δ4 |

FIG. 9

|  | R1 | R2 | R1+R2 | Δn |  |
|---|---|---|---|---|---|
| P2 | 2.31 | 2.54 | 4.85 |  |  |
| P1 | 2.51 | 2.22 | 4.72 | 0.12 | Δ1 |
| P4 | 2.19 | 2.25 | 4.44 | 0.28 | Δ2 |
| P6 | 2.03 | 2.38 | 4.41 | 0.03 | Δ3 |
| P3 | 2.20 | 2.11 | 4.31 | 0.10 | Δ4 |

FIG. 10

|  | R1 | R2 | R1/R2 | δn |  |
|---|---|---|---|---|---|
| P2 | 2.31 | 2.54 | 0.91 |  |  |
| P3 | 2.20 | 2.11 | 1.04 |  | δ1 |
| P4 | 2.19 | 2.25 | 0.98 | 0.06 | δ2 |
| P5 | 2.10 | 2.34 | 0.89 | 0.08 | δ3 |
| P6 | 2.03 | 2.38 | 0.86 | 0.04 | δ4 |

FIG. 11

|  | R1 | R2 | R1/R2 | Δn |  |
|---|---|---|---|---|---|
| P1 | 2.51 | 2.22 | 1.13 |  |  |
| P2 | 2.31 | 2.54 | 0.91 | 0.22 | δ1 |
| P3 | 2.20 | 2.11 | 1.04 |  | δ2 |
| P4 | 2.19 | 2.25 | 0.98 | 0.06 | δ3 |
| P6 | 2.03 | 2.38 | 0.86 | 0.12 | δ4 |

TIRE MOUNTING STATE DETECTION SYSTEM, TIRE MOUNTING STATE DETECTION METHOD, AND TIRE MOUNTING STATE DETECTION PROGRAM

CROSS REFERENCE TO RELATED APPLICATIONS

This application is a National Stage of International Application No. PCT/JP2019/031407 filed Aug. 8, 2019, claiming priority based on Japanese Patent Application No. 2018-159282 filed Aug. 28, 2018.

TECHNICAL FIELD

The present invention relates to a tire mounting state detection system, a tire mounting state detection method and a tire mounting state detection program for detecting the state of a transmitter equipped on a tire mounted on a vehicle.

BACKGROUND ART

In order to measure the internal pressure and temperature of a tire (where the tire is mounted on a rim wheel) mounted on a vehicle, a sensor including a transmitter of a radio signal (radio wave) is widely mounted in the tire.

The information detected by the sensor needs to be managed in association with the wheel position (Front right wheel, rear left wheel, etc.) of the vehicle on which the tire is mounted. However, since the wheel position to which the tire (Sensor) is mounted is changed by rotation or the like, it is necessary to update the correspondence between the identifier (ID) of the sensor and the wheel position each time.

Therefore, a method of automatically detecting the position of a wheel on which a tire (Sensor) is mounted is known in order to avoid such complication of updating. For example, in the tire air pressure monitoring system disclosed in Patent Literature 1, 2 receivers are disposed in the longitudinal direction of the vehicle, and a sensor provided in the tire for sensing the rotational direction of the tire is used to automatically detect the position of the wheel on which the tire (Sensor) is mounted.

CITATION LIST

Patent Literature

[PTL 1] Japanese Unexamined Patent Application Publication No. 2007-045201

SUMMARY OF INVENTION

In the tire air pressure monitoring system described above, one sensor is attached to each tire, and it is assumed that each sensor, specifically each transmitter, is operating normally.

However, in a tire mounted on an actual vehicle (In particular, dump trucks running on mining sites such as mines), a radio signal from a transmitter may not be detected due to failure, forgetting to turn on a power source, forgetting to install, or the like. Furthermore, in some cases, a plurality of sensors (That is, the transmitter) are erroneously attached to one tire.

In such a case, the tire air pressure monitoring system described above cannot correctly detect the position of the wheel on which each tire (Transmitter) is mounted.

Accordingly, an object of the present invention is to provide a tire mounting state detection system, a tire mounting state detection method, and a tire mounting state detection program capable of detecting a state in which a transmitter is not normally mounted on a tire or is not operating when automatically detecting a wheel position on which a tire (Transmitter) is mounted.

One aspect of the present invention is a tire mounting state detection system (Tire mounting state detection system 100) for detecting the state of a transmitter (Sensor 41 to sensor 46) equipped on a tire (Tire 31 to 36) mounted on a vehicle (For example, vehicle 10), including a receiving unit (Receiving unit 105) disposed in the vehicle for receiving a radio signal transmitted from the transmitter; and the tire mounting state detection system including: a vehicle configuration holding unit (Vehicle configuration holding unit 230) for holding a vehicle configuration including the number of wheels of the vehicle; a transmitter number detection unit (Transmitter number detection unit 250) for detecting the number of transmitters based on the radio signal received by the receiving unit; a state detection unit (state detection unit 260) for detecting whether or not the number of transmitters exceeds or is short of the number of wheels, based on the number of wheels based on the vehicle configuration held by the vehicle configuration holding unit and the number of transmitters detected by the transmitter number detection unit; an output unit (Output unit 270) for outputting that the state of the transmitter is abnormal when the state detection unit determines that the number of the transmitters exceeds or is short for the number of the wheels.

One aspect of the present invention is a tire mounting state detection method for detecting the state of a transmitter equipped on a tire mounted on a vehicle, using a receiving unit disposed in the vehicle and receiving a radio signal transmitted from the transmitter. The tire mounting state detection method including the steps of: detecting the number of transmitters based on the radio signal received by the receiving unit; detecting whether or not the number of transmitters exceeds or is short of the number of wheels, based on the number of wheels based on a vehicle configuration including the number of wheels of the vehicle and the number of transmitters detected; and outputting that the state of the transmitter is abnormal when it is determined that the number of the transmitters exceeds or is short for the number of the wheels.

One aspect of the present invention is a tire mounting state detection program for detecting the state of a transmitter mounted on a tire mounted on a vehicle, using a receiving unit disposed in the vehicle and receiving a radio signal transmitted from the transmitter. The tire mounting state detection program causing a computer to execute a process for holding a vehicle configuration including the number of wheels of the vehicle; a process of detecting the number of the transmitters based on the radio signal received by the receiving unit, a process of detecting whether or not the number of transmitters exceeds or is short of the number of wheels, based on the number of wheels based on the vehicle configuration and the number of transmitters detected, and a process of outputting that the state of the transmitter is abnormal when it is determined that the number of the transmitters exceeds or is short for the number of the wheels.

BRIEF DESCRIPTION OF DRAWINGS

FIG. 4 is a table of signal strength and calculation results of the radio signal according to the state detection example 1.

FIG. 5 is a table of signal strength and calculation results of the radio signal according to the state detection example 1.

FIG. 6 is a table of signal strength and calculation results of the radio signal according to the state detection example 1.

FIG. 7 is a table of signal strength and calculation results of the radio signal according to the state detection example 1.

FIG. 8 is a table of signal strength and calculation results of the radio signal according to the state detection example 2.

FIG. 9 is a table of signal strength and calculation results of the radio signal according to the state detection example 2.

FIG. 10 is a table of signal strength and calculation results of the radio signal according to the state detection example 2.

FIG. 11 is a table of signal strength and calculation results of the radio signal according to the state detection example 2.

DESCRIPTION OF EMBODIMENTS

Figure 1:
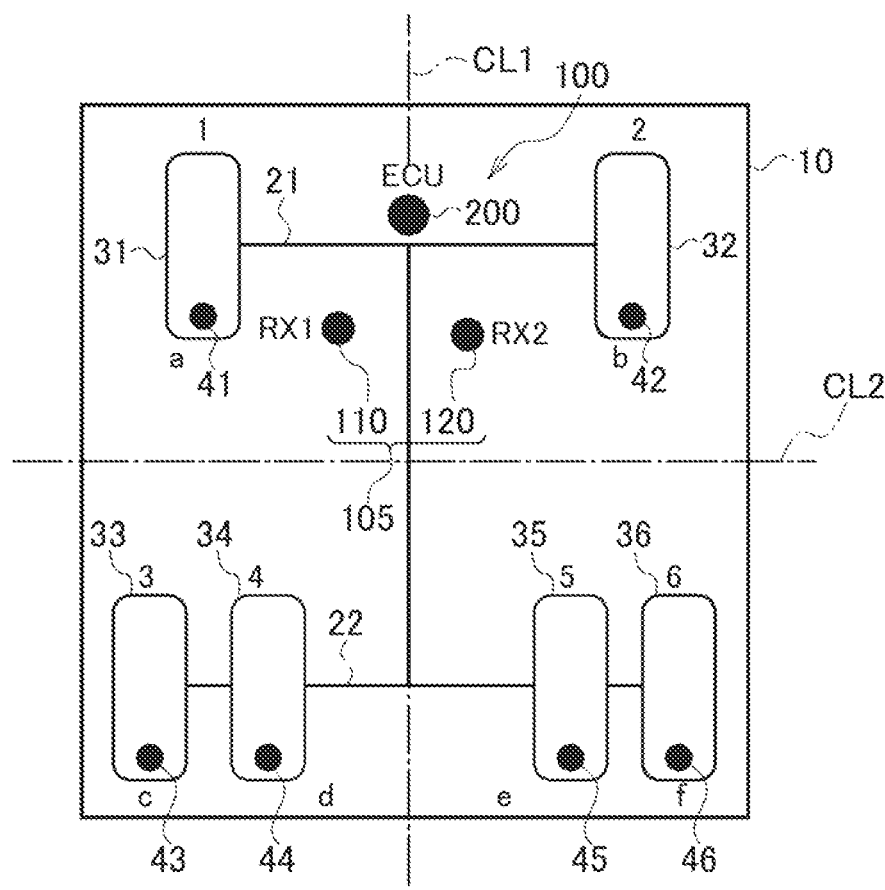
FIG. 1 is a schematic plan view of a vehicle 10 including a tire installation state detection system 100.

Hereinafter, an embodiment will be described based on the drawings. It should be noted that the same or similar reference numerals are given to the same functions and configurations, and the description thereof will be omitted as appropriate.

(1) Schematic Structure of Vehicle Including Tire Mounting State Detection System FIG. 1 is a schematic plan view of a vehicle 10 including a tire mounting state detection system 100. As shown in FIG. 1, the vehicle 10 is an automobile having a front wheel axle 21 and a rear wheel axle 22. The type of the vehicle 10 is not particularly limited, but the rear wheel axle 22 is a so-called double tire, and is mainly assumed to be a large vehicle such as a truck and a mining vehicle.

A vehicle 10 is mounted with tires 31 to 36. The tires 31 to 36 are tires (May be called a tire wheel assembly) assembled to a rim wheel.

Here, the tire 31 is mounted at the left front wheel position ("1" in the figure, hereinafter the same). Similarly, the tires 32 to 36 are mounted at positions of a right front wheel (2), a left outside rear wheel (3), a left inside rear wheel (4), a right inside rear wheel (5), and a right outside rear wheel (6), respectively.

The tire 31 is equipped with a sensor 41 for measuring the internal pressure and temperature of the tire 31. The sensor 41 may include a sensor for measuring acceleration. Sensor 41 includes a transmitter for transmitting measured internal pressure and temperature data. Similarly, the tires 32 to 36 are equipped with sensors 42 to 46. The sensors 41 to 46 may be suitably used in a tire pressure monitoring system (TPMS) or the like.

To the sensor 41, "a" is assigned as a sensor ID which is an identification for identifying the sensor 41 (Transmitter). Similarly, sensors 42 to 46 are assigned "b" to "f" as sensor IDs, respectively.

A tire mounting state detection system 100 detects the state of a tire mounted on a vehicle 10. Specifically, the tire mounting state detection system 100 detects the state of the transmitter mounted on the tires 10 to 31 mounted on the vehicle 36.

The tire mounting state detection system 100 includes a receiving unit 105 and a tire state detection device 200. The receiving unit 105 is disposed in the vehicle 10 and receives radio signals (radio wave) transmitted from the sensors 41 (Transmitter) to 46.

In this embodiment, the receiving unit 105 includes a receiver 110 and a receiver 120. In the present embodiment, the receiver 110 constitutes a first receiver. The receiver 120 constitutes a second receiver.

The receiver 110 is appropriately labeled "RX1" for convenience. The receiver 110 receives radio signals transmitted from each sensor (Transmitter), i.e., sensors 41 to 46. It should be noted that the strength (Transmit Power) of the radio signal, the frequency band to be used, and the like may vary depending on the area of use of the tire mounting state detection system 100 or the type of vehicle 10.

The receiver 120 is appropriately labeled "RX2" for convenience. The receiver 120 also receives radio signals transmitted from sensors 41 to 46. The receiver 120 is located at a different location from the receiver 110. Specifically, the receiver 120 is disposed at a position different from the receiver 110 in the vehicle width direction. The receiver 120 is disposed at the same position as the receiver 110 in the vehicle longitudinal direction.

In this embodiment, the receiver 110 is disposed on one side, more specifically, on the left side, with the center line CL1 (Widthwise center line) between the left wheel (For example, "1") and the right wheel as a reference. On the other hand, the receiver 120 is disposed on the other side with respect to the center line CL1, specifically, on the right side.

More specifically, the receiver 110 and the receiver 120 are arranged symmetrically with respect to the center line CL1.

In the present embodiment, the receiver 110 and the receiver 120 are disposed on one side, more specifically, closer to the front wheels, with the center line CL2 (longitudinal centerline) between the front wheels ("1", "2") and the rear wheels ("3" to "6") as a reference.

The tire state detection device 200 uses the receiving unit 105 to detect the tire 31 to the tire 36, that is, the position of the wheel ("1" through "6") on which the sensor 41 to the sensor 46 are equipped. In this embodiment, the tire state detection device 200 is incorporated as a part of an electronic control unit (ECU) mounted on the vehicle 10. As will be described later, the function realized by the tire state detection device 200 may be provided outside the vehicle 10 connectable via a communication network (Cloud, etc.).

(2) Function Block Configuration of Tire Mounting State Detection System

Next, a functional block configuration of the tire mounting state detection system 100 will be described. Specifically, a functional block configuration of the tire state detection device 200 constituting the tire mounting state detection system 100 will be described.

Figure 2:
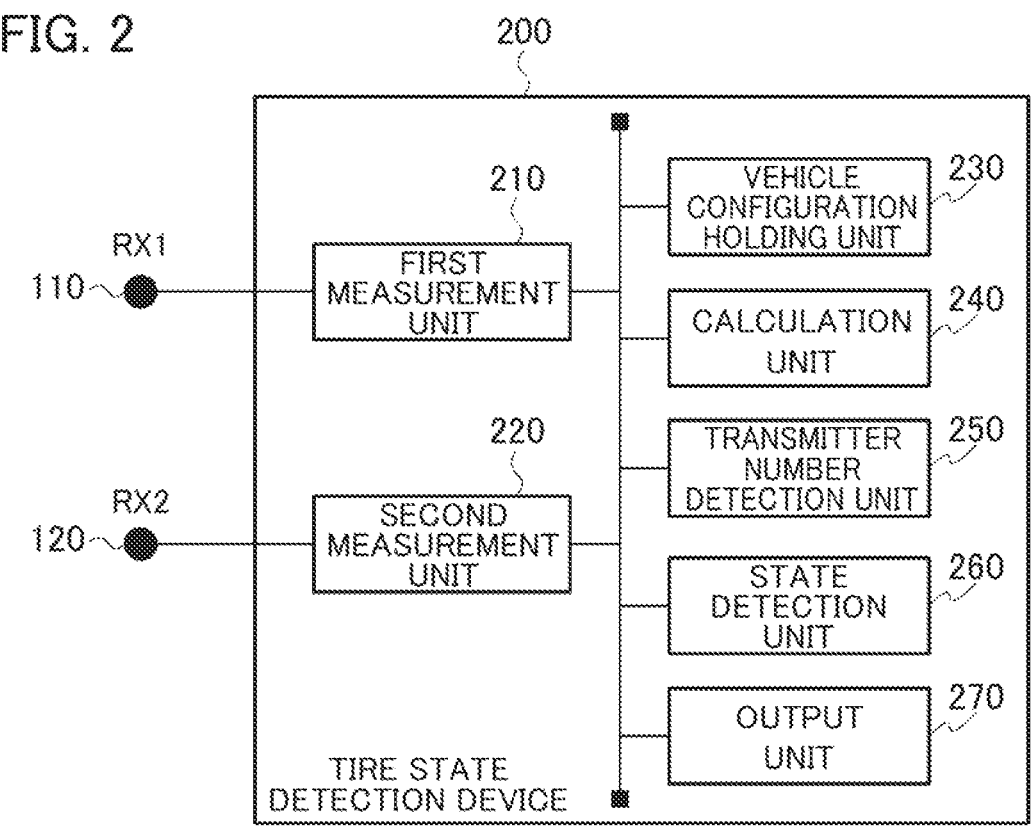
FIG. 2 is a functional block diagram of a tire state detection device 200.

FIG. 2 is a functional block diagram of the tire state detection device 200. As shown in FIG. 2, the tire state detection device 200 includes a first measurement unit 210, a second measurement unit 220, a vehicle configuration holding unit 230, a calculation unit 240, a transmitter number detection unit 250, a state detection unit 260, and an output unit 270.

The tire state detection device 200 has hardware such as a CPU and a memory, and the above-mentioned respective functional parts are realized by executing a computer program (Software) on the hardware.

The first measurement unit 210 is connected to the receiver 110. The first measurement unit 210 measures the strength (first signal strength) of the radio signal received by the receiver 110 for each of the sensors 41 to 46 (Transmitter).

The second measurement unit 220 is connected to the receiver 120. The second measurement unit 220 measures the strength (second signal strength) of the radio signal received by the receiver 120 for each of the sensors 41 to 46 (Transmitter).

Hereinafter, the signal from the transmitter received by the receiver 110 (first receiver) is appropriately denoted as R1. Similarly, the signal from the transmitter received by the receiver 120 (second receiver) is appropriately denoted as R2.

The strength of the radio signal to be measured by the first measurement unit 210 and the second measurement unit 220 may be a voltage level or a power level. Further, control may be performed in units of decibels (dB). In this embodiment, a voltage level (Units: V) is used.

In this embodiment, the radio signals transmitted from the sensors 41 to 46 include a sensor ID (identifier) that identifies each sensor (Transmitter).

A vehicle configuration holding unit 230 holds configuration information of the vehicle 10. Specifically, the vehicle configuration holding unit 230 holds a vehicle configuration including the number of wheels of the vehicle 10.

That is, the vehicle configuration holding unit 230 holds the vehicle configuration including the number of wheels of the vehicle on which the tire on having the sensor (Transmitter) is mounted. The vehicle configuration holding unit 230 may previously hold the configuration information of the vehicle 10 in a memory or may acquire the configuration information from the outside via a communication network.

The calculation unit 240 executes calculation using the strength (first signal strength) of the radio signal received by the receiver 110 and the strength (second signal strength) of the radio signal received by the receiver 120.

Specifically, the calculation unit 240 calculates the overall strength of the radio signal for each transmitter by using the first signal strength and the second signal strength. More specifically, the calculation unit 240 calculates a total value (sum) of the first signal strength and the second signal strength, that is, R1+R2, for each transmitter.

The overall strength is not limited to R1+R2, and may be a value indicating the strength or magnitude of the radio signal using the first signal strength and the second signal strength. A power value such as $(R1^2+R2^2)$ may be used.

The calculation unit 240 calculates a strength ratio, which is a ratio using the first signal strength and the second signal strength, for each transmitter.

In the present embodiment, the calculation unit 240 calculates the quotient of the first signal strength and the second signal strength for each sensor as the strength ratio. Specifically, the calculation unit 240 divides the first signal strength by the second signal strength to calculate a quotient (R1/R2).

The strength ratio may be a ratio using the first signal strength and the second signal strength, and is not limited to R1/R2. The quotient may be R2/R1, or it may be such as (R1−R2)/(R1+R2) that the values of R1 and R2 can be made dimensionless.

The transmitter number detection unit 250 detects the number of transmitters equipped on the tires 31 to 36 based on the radio signal received by the receiving unit 105. Specifically, the transmitter number detection unit 250 detects the number of transmitters equipped on the tires 31 to 36 based on radio signals (R1, R2) received by the receiver 110 and the receiver 120.

More specifically, the transmitter number detection unit 250 counts the number of transmitters equipped on the tire mounted on the vehicle 10 based on radio signals received by the receiver 110 and the receiver 120 during a predetermined time.

In the present embodiment, as described above, since the wireless signal includes a sensor ID (identifier) for identifying each sensor (Transmitter), the transmitter number detection unit 250 counts the number of transmitters based on the sensor ID.

The transmitter number detection unit 250 detects the number of transmitters equipped on the tire mounted on the vehicle 10 (own vehicle) by using the number of receiving times of a radio signal transmitted from the same transmitter.

That is, when the number of times of receiving the radio signal transmitted from the same transmitter is less than the predetermined number, the transmitter number detection unit 250 may exclude the transmitter from the detection target. In particular, when the vehicle 10 is parked (or stop), there is a possibility that there is a vehicle of the same specification nearby, and there is a case where a radio signal from a tire mounted on the vehicle is erroneously detected.

Furthermore, as will be described later, when the vehicle 10 is parked (or stop), the operation itself of the tire state detection device 200 may be stopped in order to prevent such erroneous detection.

It should be noted that whether or not the vehicle 10 is parked (or stop) may be determined using information provided from the vehicle 10 (Driving speed, etc.), or may be determined using a satellite positioning system such as a global positioning system (GPS).

The state detection unit 260 detects whether the number of transmitters exceeds or is short of the number of wheels based on the vehicle configuration held by the vehicle configuration holding unit 230 and the number of transmitters detected by the transmitter number detection unit 250.

Specifically, based on the number of wheels (6) of the vehicle 10, the transmitter number detection unit 250 detects whether the number of detected transmitters exceeds 6 (That is, 7 or more) or is less than 6 (That is, less than or equal to 5).

More specifically, the state detection unit 260 detects, based on the overall strength of each detected transmitter, more specifically, based on the magnitude relationship of R1+R2, whether the number of transmitters exceeds, more specifically, whether the number of transmitters is short, more specifically, whether the transmitter is not activated or the number of transmitters is short, and whether the transmitter is equipped at the wheel position of the front wheel side of the vehicle 10 or at the wheel position of the rear wheel side of the vehicle 10.

Further, the state detection unit 260 detects, based on the detected strength ratio of the respective transmitters, more specifically, based on the magnitude relationship of R1/R2, whether the number of the transmitters exceeds or the transmitter-unactivated tires are equipped at the left wheel position of the vehicle 10 or the right wheel position of the vehicle 10.

In the present embodiment, the state detection unit 260 uses Δn and δn to detect whether the number of transmitters exceeds or is short of the number of wheels.

$$\Delta_n = (R1_n + R2_n) - (R1_{(n+1)} + R2_{(n+1)})$$ [Formula 1]

$$\delta_n = (R1_n/R2_n) - (R1_{(n+1)}/R2_{(n+1)})$$ [Formula 2]

Δn is obtained by sorting the values of R1+R2 in descending order and calculating the difference between the values of R1+R2 and the values of R1+R2 ($R1_{n+1}$, $R2_{n+1}$). n indicates the order (Order and correspondence of the rows in the table shown in FIGS. 4 to 11) based on the magnitude relation of R1+R2.

Similarly, δn is obtained by sorting the values of R1/R2 in descending order to obtain a difference between the values of R1/R2 and the values of R1/R2 ($R1_{n+1}$, $R2_{n+1}$).

Here, since R1+R2 provides information on the transmitter in the vehicle longitudinal direction, by using Δn, it can be determined whether the tire in which the transmitter is exceeded or insufficient belongs to the front wheel side or the rear wheel side of the vehicle 10.

Further, since R1/R2 provides information on the transmitter in the vehicle width direction (vehicle lateral direction), by using Δn, it can be determined whether the tire in which the transmitter is excessive or short belongs to the left wheel side or the right wheel side of the vehicle 10.

That is, by using Δn and δn, the state detection unit 260 can detect at which wheel position of the vehicle 10 the tire in which the transmitter is excessive or short is mounted.

The output unit 270 outputs that the state of the transmitter is abnormal when the state detection unit 260 determines that the number of transmitters exceeds or is short for the number of wheels.

Specifically, the output unit 270 can output the wheel position where the tire in which the transmitter is excessive or short is mounted. That is, the output unit 270 outputs the detection result of the wheel position by the state detection unit 260.

The output unit 270 can display, on a display device of the vehicle 10, the state of the transmitter being abnormal, or the wheel position where the tire in which the transmitter is excessive or short is mounted, or can sound an alarm. Alternatively, the output unit 270 may directly output the content to a control device or the like of the vehicle 10.

(3) Operation of the Tire Mounting Condition Detection System

Next, the operation of the tire mounting state detection system 100 will be described. Specifically, the operation of detecting the state of the transmitter equipped on the tires 31 to 36 mounted on the vehicle 10 will be described.

(3.1) Transmitter State Detection Flow

Figure 3:
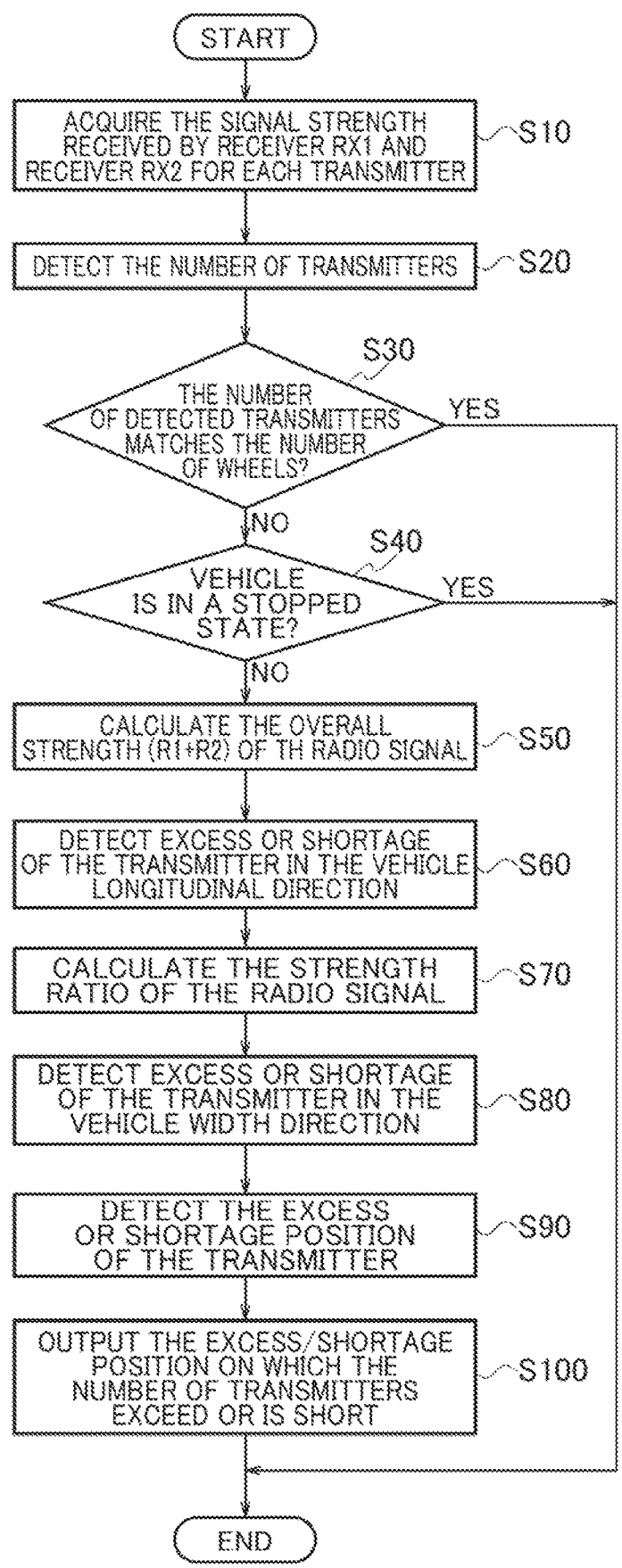
FIG. 3 shows a state detection flow of the transmitter by the tire mounting state detection system 100.

FIG. 3 shows a state detection flow of the transmitter by the tire mounting state detection system 100. As shown in FIG. 3, the tire mounting state detection system 100, specifically, the tire state detection device 200, acquires the strength of the radio signal received by the receiver 110 (RX1) and the receiver 120 (RX2) (S 10).

Specifically, the tire state detection device 200 acquires the signal strength of the radio signal for each transmitter received by the receiver 110 (RX1) and the receiver 120 (RX2).

The tire state detection device 200 detects the number of transmitters based on the acquired signal strength (S 20).

In this embodiment, as described above, the tire state detection device 200 counts the number of transmitters equipped on the tire mounted on the vehicle 10 based on the radio signals received by the receiver 110 and the receiver 120 during a predetermined time.

The tire state detection device 200 determines whether the number of detected transmitters matches the number of wheels (6) based on the vehicle configuration of the holding vehicle 10 (S 30).

If the number of transmitters does not match the number of wheels, that is, if the number of transmitters exceeds or is short for the number of wheels, the tire state detection device 200 determines whether the vehicle 10 is in a stopped state (S 40).

The stop includes both parking and stopping of the vehicle 10. This is because, as described above, when the vehicle 10 is parked (or stop), there is a possibility that there is a vehicle of the same specification nearby, and a radio signal from a tire mounted on the vehicle may be erroneously detected.

The processing in steps 30 and 40 may be reversed. That is, after determining whether or not the vehicle 10 is in a stopped state, it may be determined whether or not the number of detected transmitters matches the number of wheels based on the vehicle configuration of the vehicle 10 being held.

When the vehicle 10 is not in the stopped state, the tire state detection device 200 calculates the overall strength of each detected transmitter (S 50). Specifically, the tire state detection device 200 calculates the total value (sum) of the strength (first signal strength) of the radio signal received by the receiver 110 and the strength (second signal strength) of the radio signal received by the receiver 120, that is, R1+R2, for each transmitter.

The tire state detection device 200 detects excess or shortage of the transmitter in the vehicle longitudinal direction based on the magnitude relationship of R1+R2 (S 60). Specifically, the tire state detection device 200 detects whether the wheel position (excess or shortage position of the transmitter) where the number of transmitters is exceeded or the number of transmitters is short is the front wheel side of the vehicle 10 or the rear wheel side of the vehicle 10.

More specifically, the tire state detection device 200 detects whether the excess/shortage position of the transmitter is on the front wheel side of the vehicle 10 or the rear wheel side of the vehicle 10 by using the above-described Δn. Further, an example of detecting the excess/shortage position of the transmitter will be described later.

Next, the tire state detection device 200 calculates the strength ratio of each detected transmitter (S 70). Specifically, the tire state detection device 200 divides the first signal strength by the second signal strength to calculate a quotient (R1/R2).

The tire state detection device 200 detects excess or shortage of the transmitter in the vehicle width direction based on the magnitude relation of R1/R2 (S 80). Specifically, the tire state detection device 200 detects whether the transmitter is in the left side of the vehicle 10 or the right side of the vehicle 10.

More specifically, the tire state detection device 200 detects whether the excess/shortage position of the transmitter is on the left side of the vehicle 10 or on the right side of the vehicle 10 using the above-described δn.

The tire state detection device 200 detects the excess or shortage position of the transmitter based on the detection result in step 60, that is, the detection result in the vehicle longitudinal direction, and the detection result in step 80, that is, the detection result in the vehicle width direction (S 90).

Further, an example of detecting the excess/shortage position of the transmitter will be described later. The order of steps 50, 60 and steps 70, 80 may be reversed.

The tire state detection device 200 outputs the excess/shortage position of the transmitter (S 100). Specifically, the tire state detection device 200 displays information indicating the position of a wheel on which a tire with an excessive or short transmitter is mounted on the display device of the vehicle 10 or outputs the information to the control device of the vehicle 10 or the like.

As described above, the tire state detection device 200 may simply output that the state of the transmitter (Sensor) is abnormal in place of the information indicating the specific wheel position.

(3.2) Transmitter State Detection Example

Next, an example of the state detection of the transmitter by the tire mounting state detection system 100 will be described. Specifically, an example of detecting a state in which the number of transmitters exceeds the number of wheels and an example of detecting a state in which the number of transmitters is short for the number of wheels will be described.

(3.2.1) State Detection Example 1

In the present state detection example, a case where the number of transmitters (Sensor) is one more than the number of wheels will be described. FIGS. 4 to 7 are tables of signal strength and calculation results of the radio signal according to the state detection example 1.

FIG. 4 shows the signal strength in the case where the tire mounted at the wheel position "1" (See FIG. 1) is equipped with two transmitters. FIG. 5 shows signal strength in a case where two transmitters are equipped on a tire mounted at the wheel position "5".

In FIGS. 4 and 5, the ID (a, b, etc.) of the sensor is not shown, but the wheel position (P1, P2, etc.) where the tire on which the transmitter is equipped is shown. Further, in FIGS. 4 and 5, the values of R1+R2 are arranged in descending order so that the value of Δn can be easily confirmed.

In FIG. 4, Δ3 is the largest. This means that R1+R2 is significantly different between P2 and P4.

In this embodiment, since the receiver 110 and the receiver 120 are disposed in front of the vehicle 10, the signal strength of the transmitters P1 and P2 is much stronger than the signal strength of the transmitters P3 to P6.

Therefore, if no extra transmitter is equipped, if the values of R1+R2 rearrange the data in descending order, the upper two transmitters are mounted on the front wheel, and Δ2 comparing the second and third transmitters should be the largest.

In FIG. 4, Δ3 is the largest because the front wheels have two sensors. In FIG. 5, Δ2 is the largest. This is because a tire with an extra transmitter is mounted on the rear wheel. By using such features, it can be determined whether the extra transmitter belongs to the front wheel side or the rear wheel side of the vehicle 10.

FIG. 6 corresponds to FIG. 4, and FIG. 7 corresponds to FIG. 5. That is, FIG. 6 shows the signal strength in the case where two transmitters are equipped on the tire mounted at the wheel position "1". FIG. 7 shows signal strength in a case where two transmitters are equipped on a tire mounted at the wheel position "5".

In FIGS. 6 and 7, the values of R1/R2 are arranged in descending order for the transmitter groups determined to be mounted on the front wheel side and the transmitter groups determined to be mounted on the rear wheel side so that the value of δn can be easily confirmed. Note that δ3 in FIGS. 6 and 62 in FIG. 7 are left blank because they are not used to determine whether the tire on which the extra transmitter is mounted is located on the left or right side of the vehicle 10 because the transmitter on the front wheel side is compared with the transmitter on the rear wheel side.

In FIG. 6, δ1 is the smallest, which means that the difference between the value of R1/R2 of the first line transmitter and the value of R1/R2 of the second line transmitter is the smallest.

Since the receiver 110 and the receiver 120 are arranged side by side in the vehicle width direction, the small difference in the value of R1/R2 is synonymous with the small difference in the position of the transmitter in the vehicle width direction.

That is, it may be determined that the transmitter having the smallest δn is equipped on the same tire as the transmitter in the row above. Therefore, the wheel position on which the tire having each transmitter is mounted can be determined by disregarding the transmitter, determining the wheel position of the other transmitter, and then allocating the same wheel position as the transmitter determined to be equipped on the same tire.

In FIG. 7, δ5 corresponding to P5 in which two transmitters are mounted is the smallest. That is, even when a tire on which two transmitters are equipped is mounted at a wheel position on the rear wheel side which is a double tire, the same determination can be made.

(3.2.2) State Detection Example 2

In this state detection example, a case where the number of transmitters (Sensor) is one less than the number of wheels will be described. FIGS. 8 to 11 are tables of signal strength and calculation results of the radio signal according to the state detection example 2.

FIG. 8 shows the signal strength in the case where the transmitter of the tire mounted at the wheel position "1" (See FIG. 1) is not activated. FIG. 9 shows the signal strength in the case where the transmitter of the tire mounted at the wheel position "5" is not activated.

The state in which the transmitter is not activated includes a case in which the power supply of the transmitter is not turned on, a case in which the transmitter is broken, or a case in which the transmitter is not equipped. In FIGS. 8 and 9, the values of R1+R2 are arranged in descending order so that the value of Δn can be easily confirmed.

As in the state detection example 1, it can be determined whether the transmitter which is not activated belongs to the front wheel side or the rear wheel side of the vehicle 10 based on n where Δn is the largest.

When Δ1 is largest, there is only one transmitter on the front wheel side, and the tire on which the transmitter which is not activated is equipped is mounted on the front wheel side (see FIG. 8). When Δ2 is largest, the tire on which the transmitter which is not activated is mounted on the rear wheel side (see FIG. 9).

FIG. 10 corresponds to FIG. 8, and FIG. 11 corresponds to FIG. 9. That is, FIG. 10 shows the signal strength in the case where the transmitter of the tire mounted at the wheel position "1" (See FIG. 1) is not activated. FIG. 11 shows the signal strength in the case where the transmitter of the tire mounted at the wheel position "5" is not activated.

In FIGS. 10 and 11, in order to easily confirm the value of δn, the values of R1/R2 are arranged in descending order for each of the transmitter groups determined to be mounted on the front wheel side and the transmitter groups determined to be mounted on the rear wheel side.

If it is determined based on Δn that the unactivated transmitter belongs to the front wheel side of the vehicle 10, the wheel position on which the tire on which the unactivated transmitter is mounted can be determined using only the value of R1/R2.

Specifically, when the value of R1/R2 is 1.00 or more, it can be determined that the tire on which the transmitter is equipped is mounted at the wheel position "2" (P2). On the other hand, when the value of R1/R2 is 1.00 or less, it can be determined that the tire on which the transmitter is mounted is mounted at the wheel position "1" (P1).

That is, since the receiver 110 is located on the left side of the vehicle 10 and the receiver 120 is located on the right side of the vehicle 10, the fact that R1 is greater than R2 means that the transmitter should be located on the left side of the vehicle 10. On the other hand, R2 is greater than R1 because the transmitter should be located on the right side of the vehicle 10.

In FIG. 10, since the value of R1/R2 based on the signal strength of the radio signal from the transmitter in which R1+R2 is largest (4.85) is 1.00 or less (0.91), it can be determined that the transmitter is equipped on the tire mounted at the wheel position "2" (P2). That is, it can be determined that the tire on which the transmitter which is not activated is mounted is mounted at the wheel position "1" (P1).

It should be noted that the positions of the wheels on which the tires mounted with the remaining transmitters are mounted may be set from the wheel position "3" (P3) to the wheel position "6" (P6) in descending order of R1/R2.

On the other hand, when it is determined based on Δn that the transmitter which is not activated belongs to the rear wheel side of the vehicle 10, δn is used as shown in FIG. 11.

As described above, δn represents the positional relationship between the transmitters in the vehicle width direction, specifically, the distance between the transmitters and the adjacent transmitters in the vehicle width direction. Therefore, when the wheel positions (P3, P4 and P5, P6) in the vehicle width direction on the rear wheel side are compared, δn becomes largest.

In FIG. 11, since the transmitter of the tire mounted at the wheel position "5" (P5) is not activated, δ4 between P4 and P6 becomes the largest. In other words, if n at which δn is maximum is 3, it can be determined that the transmitter is not activated in either of P3 and P4.

Similarly, if n at which δn is largest is 4, it can be determined in either of P5 and P6 that the transmitter is not activated.

Then, based on the size of R1/R2, it is determined whether the tire in which the transmitter is not activated is P3 or P4 (P5, P6).

(4) Function and Effects

According to the embodiment described above, the following effects can be obtained. Specifically, according to the tire mounting state detection system 100, based on the number of wheels based on the vehicle configuration of the vehicle 10 and the number of transmitters (Sensor) detected by the transmitter number detection unit 250, it is detected whether the number of transmitters exceeds or is short of the number of wheels.

Further, according to the tire mounting state detection system 100, when it is determined that the number of transmitters exceeds or is short for the number of wheels, the state of the transmitters being abnormal or a detection result of wheel position on which the number of transmitters being exceeded or the number of transmitters being short (excess or shortage position of the transmitter) is output.

Therefore, in the case of automatically detecting the position of a wheel on which a tire (Transmitter) is mounted, a state in which the transmitter is not normally equipped on the tire or is not operated can be detected. Further, the excess/shortage position of the transmitter can be detected.

Thus, the convenience of the system for automatically detecting the position of the wheel on which the tire (Transmitter) is mounted can be remarkably improved. In particular, even when a radio signal from the transmitter cannot be detected due to a failure, forgetting to turn on the power, forgetting to install, or the like, or when a plurality of sensors (That is, the transmitter) are erroneously attached to one tire, it can be quickly recognized that the state of the transmitter is abnormal.

In this embodiment, the overall strength of the radio signal is calculated for each transmitter using the first signal strength and the second signal strength. Further, based on the calculated magnitude relationship of the overall strength, it is detected that the excess/shortage position of the transmitter is attached to the wheel position of either the front wheel side of the vehicle 10 or the rear wheel side of the vehicle 10.

In the present embodiment, an strength ratio, which is a ratio using the first signal strength and the second signal strength, is calculated for each transmitter. Further, based on the calculated magnitude relationship of the strength ratio, it is detected that the excess/shortage position of the transmitter is attached to the wheel position of either the left side of the vehicle 10 or the right side of the vehicle 10.

By combining such detection methods, it is possible to detect the specific excess or shortage position of the transmitter. Therefore, the work of returning the transmitter to the normal state is remarkably facilitated.

(5) Other Embodiments

While the contents of the present invention have been described in accordance with the above embodiments, it will be apparent to those skilled in the art that the present invention is not limited to these descriptions and that various modifications and improvements are possible.

Figure 12:
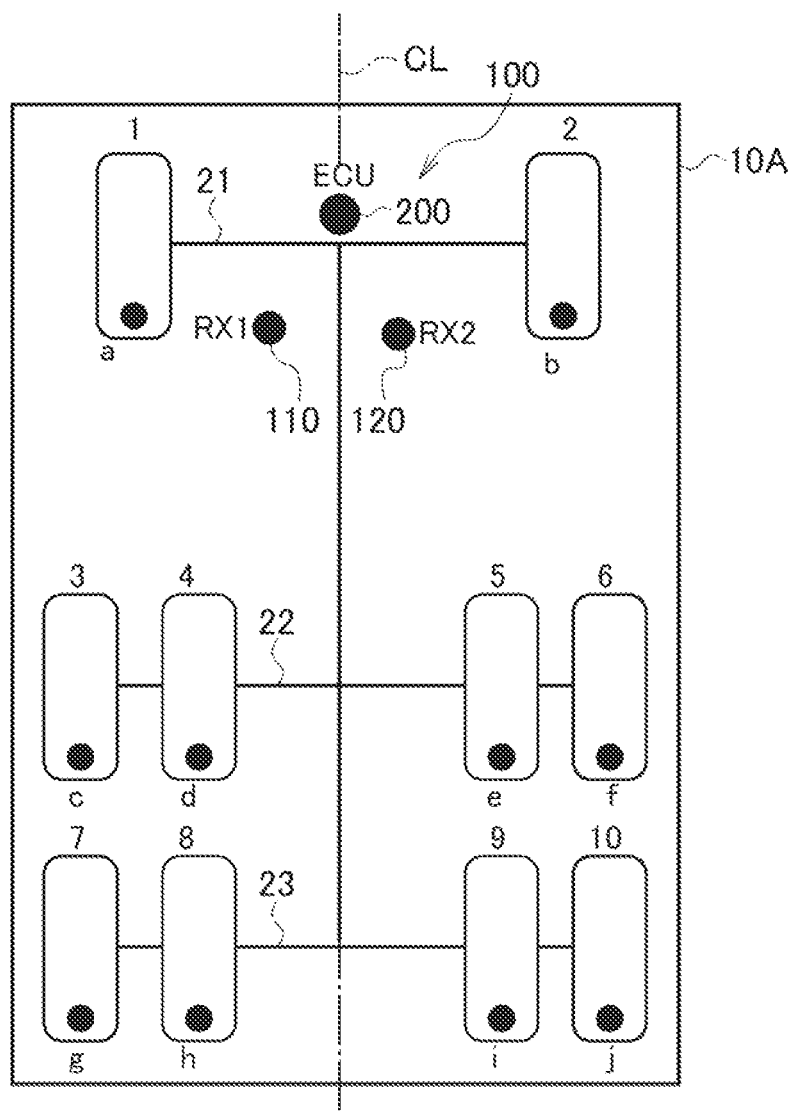
FIG. 12 is a schematic plan view of a vehicle 10A according to a modification.

For example, the tire mounting state detection system 100 may function similarly in a vehicle different in vehicle configuration from the vehicle 10. FIG. 12 is a schematic plan view of a vehicle 10A according to a modification.

As shown in FIG. 12, the vehicle 10A includes a front wheel axle 21 and two rear wheel axles, specifically a rear wheel axle 22 and a rear wheel axle 23.

Even in the case of the vehicle 10A, the excess/shortage position of the transmitter can be detected by using the above-mentioned total strength (R1+R2) and the strength ratio (R1/R2).

In the above-described embodiment, the case where there are one more transmitters (Sensor) has been described, but even in the case where there are two or more transmitters, the excess/shortage position of the transmitters can be detected by using the above-described total strength (R1+R2) and the strength ratio (R1/R2).

In the above-described embodiment, the receiver 110 and the receiver 120 are disposed closer to the front wheels with respect to the center line CL2 (See FIG. 1), but may be disposed closer to the rear wheels with respect to the center line CL2.

In the above-described embodiment, the tire state detection device 200 is incorporated as a part of an electronic control unit (ECU) mounted on the vehicle 10.

Figure 13:
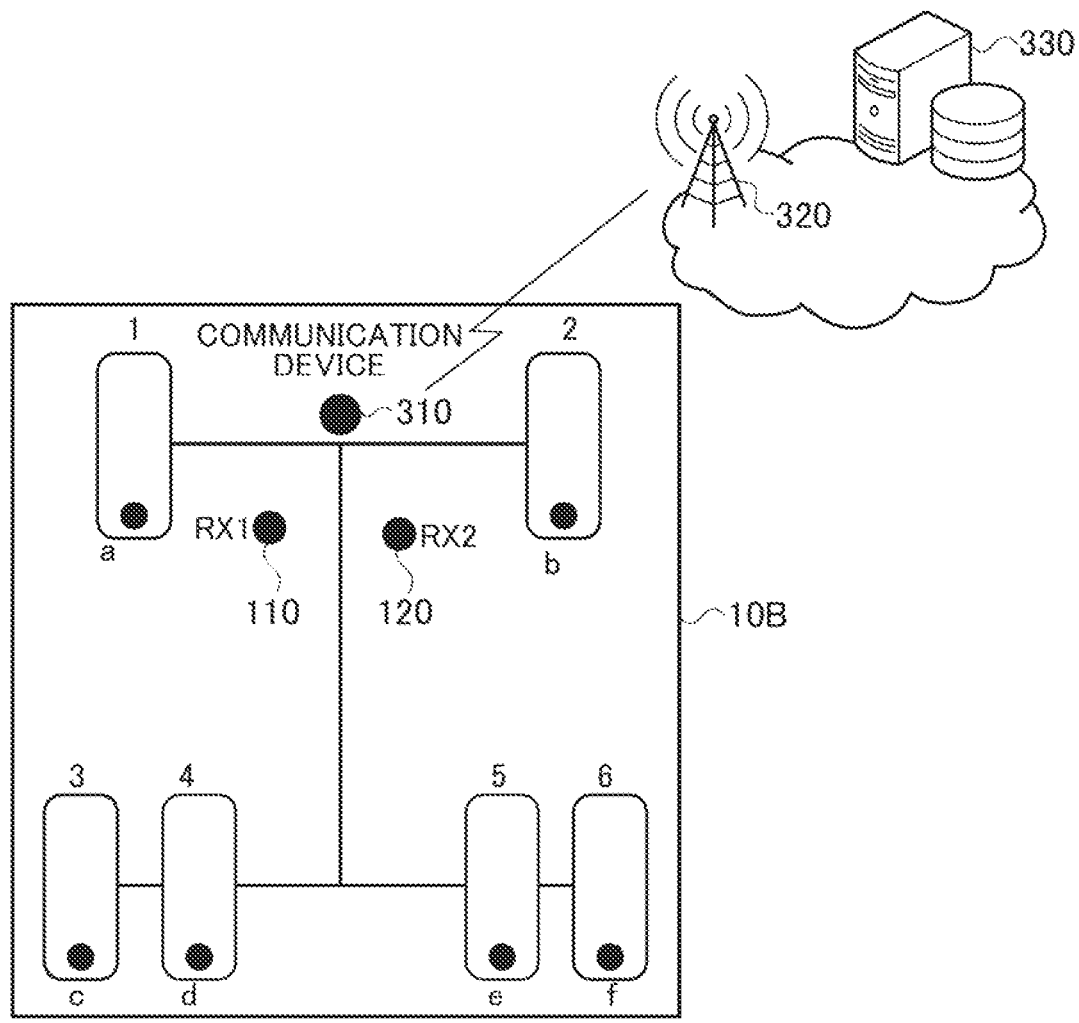
FIG. 13 is a schematic plan view and schematic network diagram of a vehicle 10B according to a modification.

FIG. 13 is a schematic plan view and a schematic network configuration view of a vehicle 10B according to a modification. As shown in FIG. 13, the vehicle 10B includes a communication device 310 instead of the tire state detection device 200.

The communication device 310 may perform wireless communication with a wireless base station 320. The communication device 310 is, for example, a wireless communication terminal connectable to a mobile communication network (LTE, etc.).

The server computer 330 is provided on a communication network and realizes functions (first measurement unit 210, second measurement unit 220, vehicle configuration holding unit 230, calculation unit 240, transmitter number detecting unit 250, state detection unit 260, and output unit 270) which have been realized by the tire state detection device 200.

The program (software, which may be called a program product) for realizing the function may be stored in a state capable of downloading on the communication network or may be provided in a form stored in a storage medium.

Further, in the above-described embodiment, the radio signal transmitted from the sensor (Transmitter) includes an identifier (Sensor ID) for identifying the sensor (Transmitter), but such an identifier is not necessarily required when the sensor can be identified by another method (e.g., the frequency band used, or the channel number).

Although embodiments of the invention have been described as described above, the discussion and drawings which form part of this disclosure should not be construed as limiting the invention. Various alternative embodiments, embodiments and operational techniques will be apparent to those skilled in the art from this disclosure.

REFERENCE SIGNS LIST 10, 10A, 10B vehicles
21 front wheel axle
22, 23 rear wheel axles
31-36 tires
41-46 sensors
100, 100A tire mounting state detection system
105 receiving unit
110, 120 receivers
200 tire state detection device
210 first measurement unit
220 second measurement unit
230 vehicle configuration holding unit
240 calculation unit
250 transmitter number detection unit
260 state detection unit
270 output unit
310 communication device
320 wireless base station
330 server computer

The invention claimed is:

1. A tire mounting state detection system for detecting the state of a plurality of transmitters respectively equipped on a plurality of tires mounted on a vehicle, including a receiving unit disposed in the vehicle for receiving a radio signal transmitted from the plurality of transmitters; and the tire mounting state detection system comprising:
a memory configured to hold a vehicle configuration including a number of wheels of the vehicle; and
at least one processor configured to
detect a number of transmitters based on the radio signal received by the receiving unit;
detect whether or not the number of transmitters exceeds or is short of the number of wheels, based on the number of wheels based on the vehicle configuration held by the memory and the detected number of transmitters;
output that a state of the transmitter is abnormal when it is determined that the number of the transmitters exceeds or is short for the number of the wheels; wherein
wherein the receiving unit includes a first receiver and a second receiver, the first receiver is disposed on one side of a widthwise center line between a left wheel and a right wheel, and the second receiver is disposed on the other side with respect to the widthwise center line,
wherein the at least one processor is further configured to
measure a first signal strength, which is the strength of the radio signal received by the first receiver, for each transmitter;
measure a second signal strength, which is the strength of the radio signal received by the second receiver, for each transmitter;
calculate a strength ratio, which is a ratio using the first signal strength and the second signal strength, for each transmitter; and
detect, based on a magnitude relationship of the strength ratio, that the number of transmitters exceeds the number of wheels or that a tire having one of the plurality of transmitters not activated is mounted at a wheel position on either a left side of the vehicle or a right side of the vehicle.

2. The tire mounting state detection system according to claim 1, wherein the at least one processor is configured to output a detection result of the detected wheel position.

3. A tire mounting state detection method for detecting the state of a plurality of transmitters respectively equipped on a plurality of tires mounted on a vehicle, using a receiving unit disposed in the vehicle and receiving a radio signal transmitted from the plurality of transmitters; the tire mounting state detection method comprising:
detecting a number of transmitters based on the radio signal received by the receiving unit;
detecting whether or not the number of transmitters exceeds or is short of the number of wheels, based on the number of wheels based on a vehicle configuration including the number of wheels of the vehicle and a number of transmitters detected; and
outputting that a state of the transmitter is abnormal when it is determined that the number of the transmitters exceeds or is short for the number of the wheels;
wherein the receiving unit includes a first receiver and a second receiver, the first receiver is disposed on one side of a widthwise center line between a left wheel and a right wheel, and the second receiver is disposed on the other side with respect to the widthwise center line,
measure a first signal strength, which is the strength of the radio signal received by the first receiver, for each transmitter;
measure a second signal strength, which is the strength of the radio signal received by the second receiver, for each transmitter;
calculate a strength ratio, which is a ratio using the first signal strength and the second signal strength, for each transmitter; and
detect, based on a magnitude relationship of the strength ratio, that the number of transmitters exceeds the number of wheels or that a tire having one of the plurality of transmitters not activated is mounted at a wheel position on either a left side of the vehicle or a right side of the vehicle.

4. A non-transitory computer-readable medium including a tire mounting state detection program for detecting the state of a plurality of transmitters respectively mounted on plurality of tires mounted on a vehicle, using a receiving unit disposed in the vehicle and receiving a radio signal transmitted from the plurality of transmitters; the tire mounting state detection program causing a computer to execute:
- a process of holding a vehicle configuration including a number of wheels of the vehicle;
- a process of detecting a number of the transmitters based on the radio signal received by the receiving unit;
- a process of detecting whether or not the number of transmitters exceeds or is short of the number of wheels, based on the number of wheels based on the vehicle configuration and the number of transmitters detected; and
- a process of outputting that a state of the transmitter is abnormal when it is determined that the number of the transmitters exceeds or is short for the number of the wheels;

wherein the receiving unit includes a first receiver and a second receiver, the first receiver is disposed on one side of a widthwise center line between a left wheel and a right wheel, and the second receiver is disposed on the other side with respect to the widthwise center line,
- a process of measuring a first signal strength, which is the strength of the radio signal received by the first receiver, for each transmitter;
- a process of measuring a second signal strength, which is the strength of the radio signal received by the second receiver, for each transmitter;
- a process of calculating a strength ratio, which is a ratio using the first signal strength and the second signal strength, for each transmitter; and
- a process of detecting, based on a magnitude relationship of the strength ratio, that the number of transmitters exceeds the number of wheels or that a tire having one of the plurality of transmitters not activated is mounted at a wheel position on either a left side of the vehicle or a right side of the vehicle.

* * * * *